US009571498B1

(12) United States Patent
Glick

(10) Patent No.: US 9,571,498 B1
(45) Date of Patent: Feb. 14, 2017

(54) SYSTEMS AND METHODS FOR PROTECTING PURPOSE-BUILT APPLIANCES ON LOCAL NETWORKS

(71) Applicant: Symantec Corporation, Mountain View, CA (US)

(72) Inventor: Adam Glick, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 95 days.

(21) Appl. No.: 14/570,356

(22) Filed: Dec. 15, 2014

(51) Int. Cl.
*H04L 29/06* (2006.01)

(52) U.S. Cl.
CPC ........... *H04L 63/10* (2013.01); *H04L 63/0209* (2013.01)

(58) Field of Classification Search
None
See application file for complete search history.

(56) References Cited

U.S. PATENT DOCUMENTS

| | | | | |
|---|---|---|---|---|
| 6,732,179 | B1* | 5/2004 | Brown | G06F 21/10 709/225 |
| 8,745,384 | B2* | 6/2014 | Persaud | G06F 21/606 713/165 |
| 8,918,835 | B2* | 12/2014 | Ravindran | H04L 63/104 726/1 |
| 2004/0093516 | A1* | 5/2004 | Hornbeek | H04L 67/12 726/7 |
| 2004/0174900 | A1* | 9/2004 | Volpi | H04L 29/06 370/466 |
| 2008/0165789 | A1* | 7/2008 | Ansari | G06Q 30/04 370/401 |
| 2009/0249440 | A1* | 10/2009 | Platt | H04L 63/0815 726/1 |
| 2012/0005724 | A1* | 1/2012 | Lee | H04L 63/0209 726/1 |

(Continued)

OTHER PUBLICATIONS

Gan, Junying; Zou, Chengli; Zhang, Genning; Xiao, Hui. Intelligent Household Terminal System Design Based on Linux System. 2012 Second International Conference on Instrumentation, Measurement, Computer, Communication and Control (IMCCC). http://ieeexplore.ieee.org/stamp/stamp.jsp?arnumber=6429162.*

(Continued)

*Primary Examiner* — Jeremiah Avery
(74) *Attorney, Agent, or Firm* — Fisherbroyles LLP

(57) ABSTRACT

The disclosed computer-implemented method for protecting purpose-built appliances on local networks may include (1) identifying a purpose-built appliance that is installed at a physical site to enhance the physical site with a pre-programmed functionality and that is connected to a local network that operates at the physical site, (2) intercepting, by a router of the local network, a request from a requesting device to access the pre-programmed functionality of the purpose-built appliance via the local network, (3) querying, from the router, via an authorization channel that is separate from a communication channel used to transmit the request, an owner of the physical site for authorization for the requesting device to access the purpose-built appliance, (4) receiving, by the router, the authorization from the owner, and (5) forwarding, by the router, the request from the requesting device to the purpose-built appliance. Various other methods, systems, and computer-readable media are also disclosed.

20 Claims, 7 Drawing Sheets

(56) References Cited

U.S. PATENT DOCUMENTS

2012/0190325 A1\* 7/2012 Abu-Hakima ...... H04L 12/1845
                                                      455/404.2
2013/0191885 A1\* 7/2013 Hubner ............... G06F 21/6218
                                                      726/5

OTHER PUBLICATIONS

Mortier, R.; Rodden, T.; Lodge, T.; McAuley, D.; Rotsos, C.; Moore, A.W.; Koliousis, A.; Sventek, J. Control and Understanding: Owning Your Home Network. 2012 Fourth International Conference on Communication Systems and Networks (COMSNETS). http://ieeexplore.ieee.org/stamp/stamp.jsp?arnumber=6151322.\*

\* cited by examiner

SYSTEMS AND METHODS FOR PROTECTING PURPOSE-BUILT APPLIANCES ON LOCAL NETWORKS

BACKGROUND

Computing devices are no longer just servers, desktops, and laptops, but also can be found in phones, watches, and even eyeglasses. Many appliances around the home now incorporate a growing array of computing functions, such as thermostats that can be programmed remotely and refrigerators with touchscreens for looking up and displaying recipes. The ideal smart home is composed of numerous networked smart appliances that can be controlled over the home network and can perform a variety of tasks for enhancing a home's convenience and safety, including turning on security cameras automatically when a user leaves, matching a sound system's volume level to the genre of movie being watched on the television, and texting a user when the oven has finished pre-heating. Every day this ideal is moving closer to becoming a reality and with this new reality comes new challenges in ensuring that smart homes are secure from threats.

Unfortunately, traditional systems for securing networks from attackers are typically designed with desktops and servers in mind, not toasters and stereos. Smart appliances may not be designed with the kind of robust individual security expected to be found on more traditional computing devices, potentially leaving these devices—and the home network on which they operate—open to attacks and exploits. Accordingly, the instant disclosure identifies and addresses a need for additional and improved systems and methods for protecting purpose-built appliances on local networks.

SUMMARY

As will be described in greater detail below, the instant disclosure describes various systems and methods for protecting purpose-built appliances on local networks by intercepting, at the router, requests made to purpose-built appliances on the network and querying an owner of the network about whether to forward or block the requests.

In one example, a computer-implemented method for protecting purpose-built appliances on local networks may include (1) identifying a purpose-built appliance that is installed at a physical site to enhance the physical site with a pre-programmed functionality and that is connected to a local network that operates at the physical site, (2) intercepting, by a router of the local network, a request from a requesting device to access the pre-programmed functionality of the purpose-built appliance via the local network, (3) querying, from the router, via an authorization channel that is separate from a communication channel used to transmit the request, an owner of the physical site for authorization for the requesting device to access the pre-programmed functionality of the purpose-built appliance via the local network, (4) receiving, by the router, the authorization from the owner of the physical site for the requesting device to access the pre-programmed functionality of the purpose-built appliance via the local network, and (5) forwarding, by the router, the request from the requesting device to the purpose-built appliance in response to receiving the authorization instead of blocking the request at the router.

In one embodiment, the computer-implemented method may further include (1) intercepting, by the router of the local network, an additional request from an additional requesting device to access the pre-programmed functionality of the purpose-built appliance via the local network, (2) querying, from the router, via the authorization channel, the owner of the physical site for an additional authorization for the additional requesting device to access the pre-programmed functionality of the purpose-built appliance via the local network, (3) failing to receive, by the router, the additional authorization from the owner of the physical site for the additional requesting device to access the pre-programmed functionality of the purpose-built appliance via the local network, and (4) blocking, by the router, the additional request from the additional requesting device from reaching the purpose-built appliance in response to failing to receive the additional authorization. In some examples, failing to receive the additional authorization may include receiving, by the router, a response from the owner that declines the additional request.

In one embodiment, the requesting device may not be part of the local network and querying the owner may be based at least in part on not trusting the request because the requesting device has not demonstrated access to the local network. In some embodiments, the computer-implemented method may further include (1) intercepting, by the router of the local network, an additional request from an additional requesting device to access the pre-programmed functionality of the purpose-built appliance via the local network, (2) determining that the additional requesting device is within the local network, and (3) forwarding, by the router, the additional request from the additional requesting device to the purpose-built appliance in response to determining that the additional requesting device is within the local network instead of querying the owner of the physical site for the authorization.

In one embodiment, receiving, by the router, the authorization from the owner may include receiving physical input from the owner to an input sensor on the router. In another embodiment, receiving, by the router, the authorization from the owner may include receiving a response sent by the owner from an additional device. Additionally or alternatively, receiving, by the router, the authorization from the owner may include receiving a response from the requesting device that may include a token previously provided to the owner. In some embodiments, the token previously provided to the owner may include a token physically inscribed on the router and/or a token sent to the owner while querying the owner for the authorization.

In one example, the requesting device may not be owned by the owner of the physical site. For example, the requesting device may be owned by a guest of the owner.

In one embodiment, the computer-implemented method may further include (1) intercepting, by the router of the local network, an additional request from the requesting device to access the pre-programmed functionality of the purpose-built appliance via the local network, (2) determining that the requesting device previously received the authorization from the owner of the physical site, and (3) forwarding, by the router, the additional request from the requesting device to the purpose-built appliance in response to determining that the requesting device previously received the authorization instead of querying the owner of the physical site for an additional authorization. In some examples, certain types of purpose-built appliances may require an authorization for each connection request while other types may not.

In some examples, intercepting the request to access the pre-programmed functionality of the purpose-built appliance may include determining that the purpose-built appliance is of a type that, according to a security policy, requires the authorization from the owner in order for the requesting device to access the pre-programming functionality of the purpose-built appliance. For example, a security policy may specify that only certain types of purpose-built appliances require authorization.

In one embodiment, a system for implementing the above-described method may include (1) an identification module, stored in memory, that identifies a purpose-built appliance that is installed at a physical site to enhance the physical site with a pre-programmed functionality and that is connected to a local network that operates at the physical site, (2) an interception module, stored in memory, that intercepts, by a router of the local network, a request from a requesting device to access the pre-programmed functionality of the purpose-built appliance via the local network, (3) a querying module, stored in memory, that queries, from the router, via an authorization channel that is separate from a communication channel used to transmit the request, an owner of the physical site for authorization for the requesting device to access the pre-programmed functionality of the purpose-built appliance via the local network, (4) a receiving module, stored in memory, that receives, by the router, the authorization from the owner of the physical site for the requesting device to access the pre-programmed functionality of the purpose-built appliance via the local network, (5) a forwarding module, stored in memory, that forwards, by the router, the request from the requesting device to the purpose-built appliance in response to receiving the authorization instead of blocking the request at the router, and (6) at least one physical processor configured to execute the identification module, the interception module, the querying module, the receiving module, and the forwarding module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a purpose-built appliance that is installed at a physical site to enhance the physical site with a pre-programmed functionality and that is connected to a local network that operates at the physical site, (2) intercept, by a router of the local network, a request from a requesting device to access the pre-programmed functionality of the purpose-built appliance via the local network, (3) query, from the router, via an authorization channel that is separate from a communication channel used to transmit the request, an owner of the physical site for authorization for the requesting device to access the pre-programmed functionality of the purpose-built appliance via the local network, (4) receive, by the router, the authorization from the owner of the physical site for the requesting device to access the pre-programmed functionality of the purpose-built appliance via the local network, and (5) forward, by the router, the request from the requesting device to the purpose-built appliance in response to receiving the authorization instead of blocking the request at the router.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
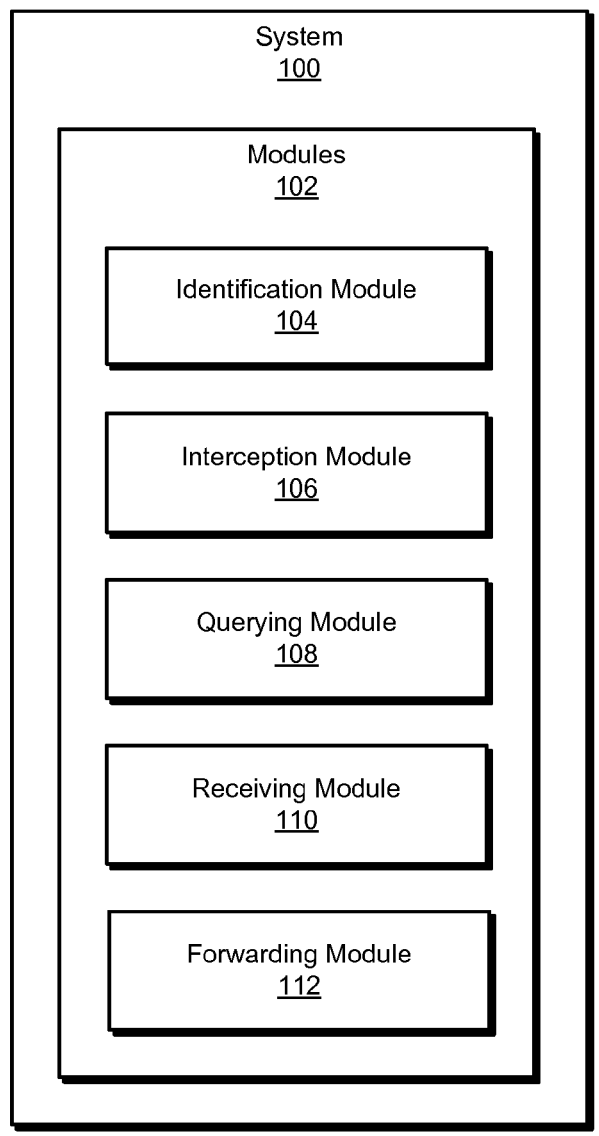
FIG. 1 is a block diagram of an exemplary system for protecting purpose-built appliances on local networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting purpose-built appliances on local networks. As will be explained in greater detail below, by querying an owner for authorization before forwarding connection requests to appliances on a local network, the systems described herein may be able to secure appliances on the local network against malicious attackers. Purpose-built appliances may lack their own security systems or otherwise provide insufficient out-of-the-box security (e.g., offering few or weak security capabilities, providing weak default passwords, etc.), so preventing malicious requests from reaching the appliances may be an important part of securing a local network.

Figure 2:
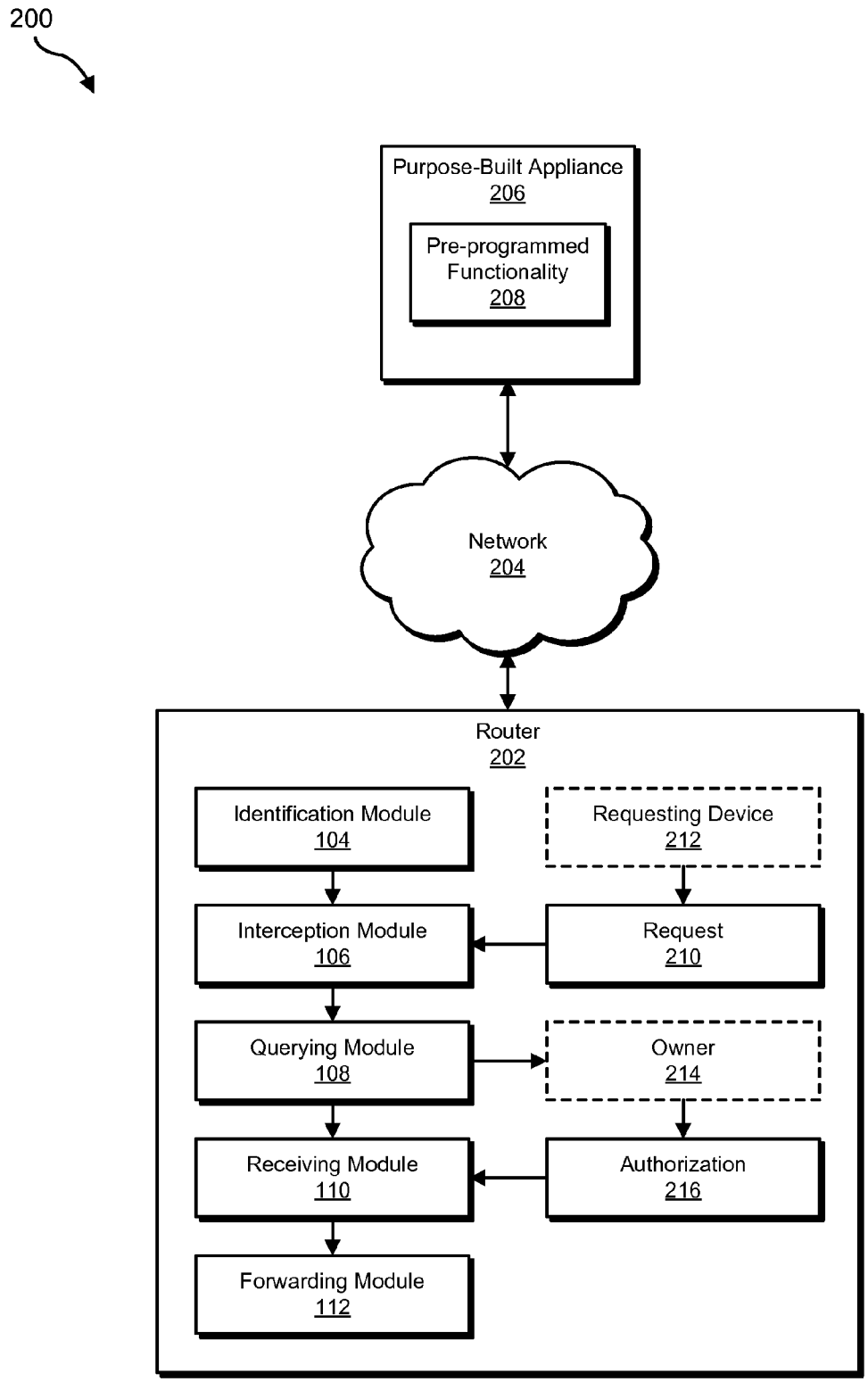
FIG. 2 is a block diagram of an additional exemplary system for protecting purpose-built appliances on local networks.
Figure 3:
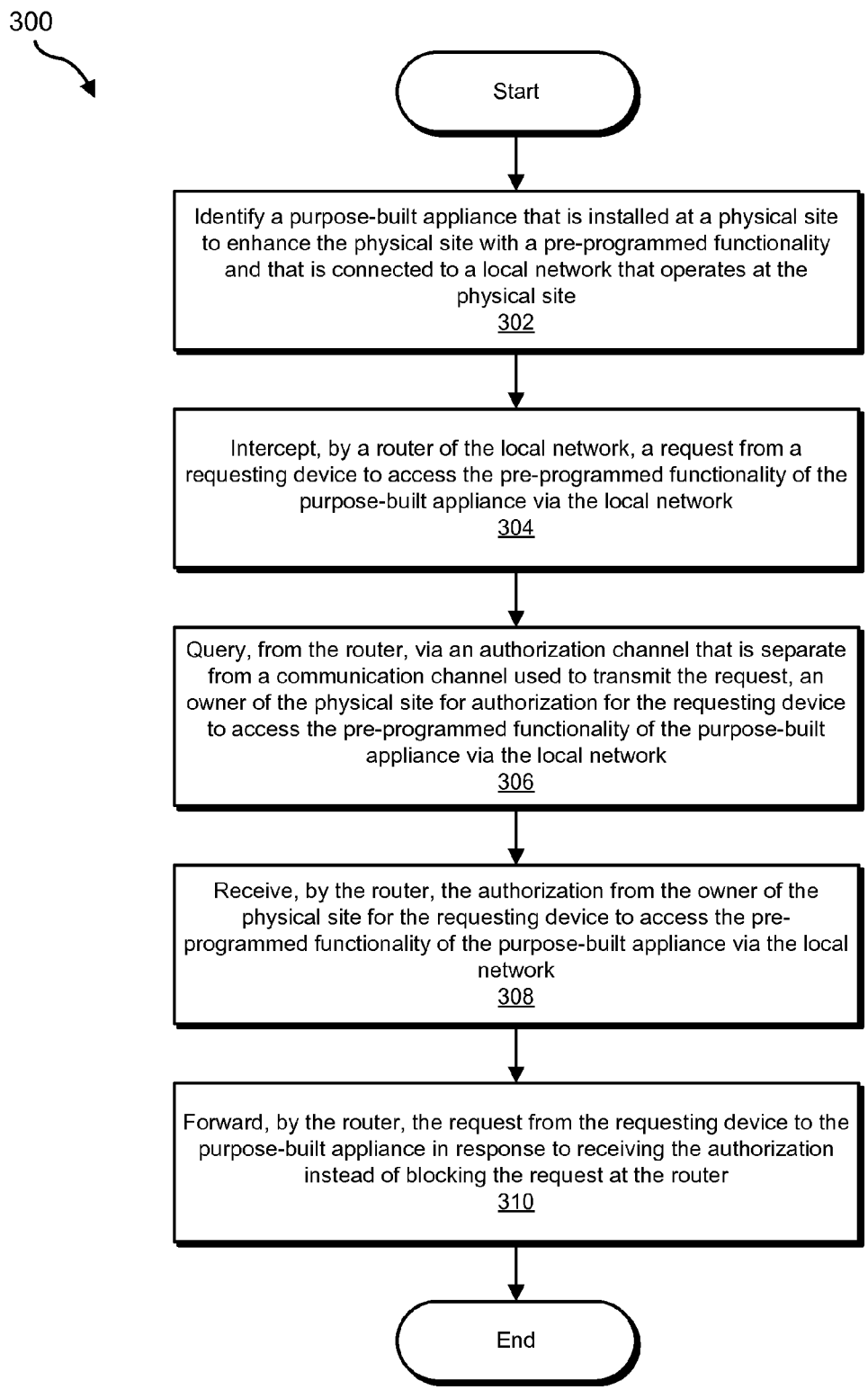
FIG. 3 is a flow diagram of an exemplary method for protecting purpose-built appliances on local networks.
Figure 4:
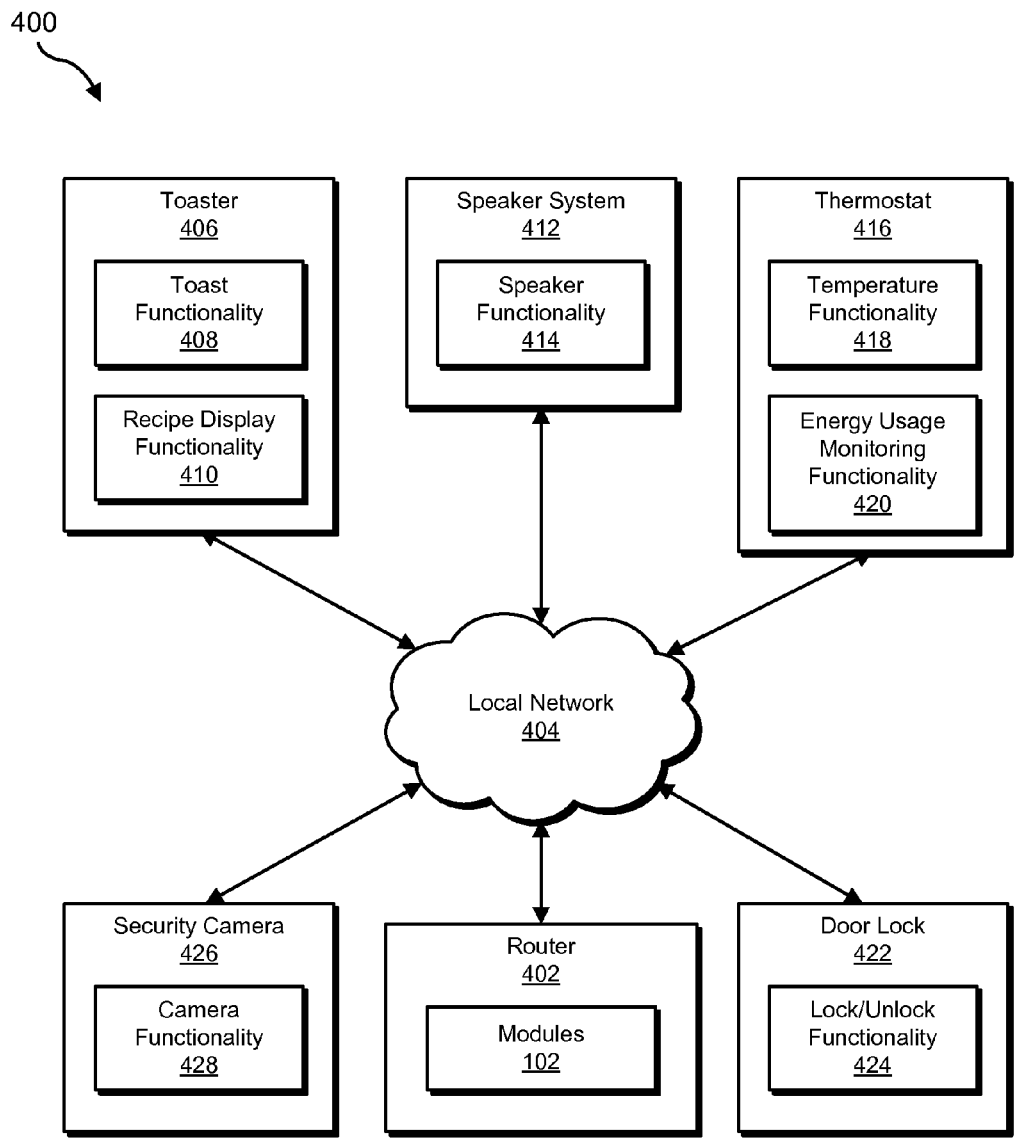
FIG. 4 is a block diagram of an exemplary computing system for protecting purpose-built appliances on local networks.

The following will provide, with reference to FIGS. 1, 2, and 4, detailed descriptions of exemplary systems for protecting purpose-built appliances on local networks. Detailed descriptions of corresponding computer-implemented methods will also be provided in connection with FIG. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for protecting purpose-built appliances on local networks. As illustrated in this figure, exemplary system 100 may include one or more modules 102 for performing one or more tasks. For example, and as will be explained in greater detail below, exemplary system 100 may include an identification module 104 that may identify a purpose-built appliance that may be installed at a physical site to enhance the physical site with a pre-programmed functionality and that may be connected to a local network that operates at the physical site.

Exemplary system 100 may additionally include an interception module 106 that may intercept, by a router of the local network, a request from a requesting device to access the pre-programmed functionality of the purpose-built appliance via the local network. Exemplary system 100 may also include a querying module 108 that may query, from the router, via an authorization channel that may be separate from a communication channel used to transmit the request, an owner of the physical site for authorization for the requesting device to access the pre-programmed functionality of the purpose-built appliance via the local network. Exemplary system 100 may additionally include a receiving module 110 that may receive, by the router, the authorization from the owner of the physical site for the requesting device to access the pre-programmed functionality of the purpose-built appliance via the local network. Exemplary system 100 may also include a forwarding module 112 that may forward, by the router, the request from the requesting device to the purpose-built appliance in response to receiving the authorization instead of blocking the request at the router. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., a router 202 and/or a purpose-built appliance 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include router 202 in communication with purpose-built appliance 206 via a network 204. In one example, router 202 may be programmed with one or more of modules 102.

In one embodiment, one or more of modules 102 from FIG. 1 may, when executed by at least one processor of router 202, enable router 202 to protect purpose-built appliances on local networks. For example, and as will be described in greater detail below, identification module 104 may identify purpose-built appliance 206 that is installed at a physical site to enhance the physical site with a pre-programmed functionality 208 and that is connected to network 204 that operates at the physical site. At some point in time, interception module 106 may intercept, by router 202 of network 204, a request 210 from a requesting device 212 to access pre-programmed functionality 208 of purpose-built appliance 206 via network 204. After interception module 106 has intercepted request 210, querying module 108 may query, from router 202, via an authorization 216 channel that is separate from a communication channel used to transmit request 210, an owner 214 of the physical site for authorization 216 for requesting device 212 to access pre-programmed functionality 208 of purpose-built appliance 206 via network 204. Next, receiving module 110 may receive, by router 202, authorization 216 from owner 214 of the physical site for requesting device 212 to access pre-programmed functionality 208 of purpose-built appliance 206 via network 204. Finally, forwarding module 112 may forward, by router 202, request 210 from requesting device 212 to purpose-built appliance 206 in response to receiving authorization 216 instead of blocking request 210 at router 202.

Router 202 generally represents any type or form of computing device capable of reading computer-executable instructions and/or forwarding requests. Examples of computing device 202 include, without limitation, laptops, tablets, desktops, servers, hardware routers, combinations of one or more of the same, exemplary computing system 610 in FIG. 6, or any other suitable computing device.

Purpose-built appliance 206 generally represents any type or form of computing device that is capable of both connecting to a network and carrying out a pre-programmed function. Examples of purpose-built appliance 206 include, without limitation, thermostats, cameras, sound systems, televisions, electronic locks, toasters, refrigerators, ovens, microwaves, lights, sprinklers, faucets, electric fences, clocks, fans, electronic doors, security systems, and/or landline telephones.

Network 204 generally represents any medium or architecture capable of facilitating communication or data transfer. In some embodiments, network 204 may include a Local Area Network (LAN). Other examples of network 204 include, without limitation, an intranet, a Wide Area Network (WAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between router 202 and purpose-built appliance 206.

FIG. 3 is a flow diagram of an exemplary computer-implemented method 300 for protecting purpose-built appliances on local networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a purpose-built appliance that is installed at a physical site to enhance the physical site with a pre-programmed functionality and that is connected to a local network that operates at the physical site. For example, identification module 104 may, as part of router 202 in FIG. 2, identify purpose-built appliance 206 that is installed at a physical site to enhance the physical site with pre-programmed functionality 208 and that is connected to network 204 that operates at the physical site.

The term "physical site," as used herein, generally refers to any physical location with effective boundaries and restrictions on who can interact with appliances within those boundaries. In some examples, a physical site may include a personal home and anyone inside the home may be able to interact with certain appliances, like the toaster. In another examples, a physical site may be an office, and only employees of the office may have physical access to and/or be allowed to interact with appliances like printers and thermostats. Other examples of physical sites include, without limitation, apartments, retail establishments, and/or other types of buildings.

The term "pre-programmed functionality," as used herein, generally refers to any function that may be performed by a purpose-built appliance that is built in to the appliance and does not rely on an application added by the end user. For example, a pre-programmed functionality of a thermostat may be to regulate the temperature in a building and/or record temperature readings and/or energy usage over a period of time. In another example, a pre-programmed functionality of a security camera may be to record and/or store video footage. Conversely, a general-purpose laptop computer that stores video footage captured by an integrated camera under the direction of an application may be an example of functionality that is not pre-programmed because, e.g., the video storage functionality may not be built into the laptop computer but may require an additional application installed by the user.

Identification module 104 may identify the purpose-built appliance that is installed at the physical site in a variety of ways. For example, identification module 104 may automatically detect whenever a new purpose-built appliance is connected to the network. In another embodiment, identification module 104 may scan the network periodically to detect new purpose-built appliances.

In some examples, identification module 104 may determine that the purpose-built appliance is a purpose-built appliance (instead of, e.g., a general-purpose computing device). For example, identification module 104 may query the device and receive information identifying the type of the device in response. Additionally or alternatively, identification module 104 may attempt to communicate with the purpose-built appliance and determine, based on the communication attempt, that the purpose-built appliance likely does not have general-purpose computing functionality. In some examples, identification module 104 may determine that the purpose-built appliance is a purpose-built appliance based on a network ID transmitted by the purpose-built appliance (e.g., a basic service set identification ("BSSID") and/or a service set identifier ("SSID")). For example, the network ID may contain information identifying the manufacturer of the device. Accordingly, identification module 104 may determine that the manufacturer is a manufacturer of purpose-built appliances. In some examples, identification module 104 may determine that the purpose-built appliance is a purpose-built appliance based on parsing a log-in and/or landing page served by the purpose-built appliance. In some examples, identification module 104 may query a central database with one or more observed characteristics of the purpose-built appliance and receive, in response an indication that the purpose-built appliance is a purpose-built appliance. As will be explained in greater detail below, in some examples, the systems described herein may perform one or more of the steps described herein based on determining that the purpose-built appliance is a purpose-built appliance. For example, these systems may determine that the purpose-built appliance is vulnerable to attacks and/or exploits due to the poor security typically provided by purpose-built appliances.

Purpose-built appliances may enhance a physical site with a variety of different pre-programmed functionalities. As illustrated in FIG. 4, a local network 404 may connect a router 402 that includes modules 102 with a number of purpose-built appliances that include different pre-programmed functionalities. Some purpose-built appliances may include one pre-programmed functionality, such as a speaker system 412 that may include a speaker functionality 414, a security camera 426 that may include a camera functionality 428, and/or a door lock 422 that may include a lock/unlock functionality 424. Other purpose-built appliances may include multiple pre-programmed functionalities, such as a toaster 406 that may include a toast functionality 408 and/or a recipe display functionality 410, a thermostat 416 that may include a temperature functionality 418 and/or energy usage and a monitoring functionality 420. In some embodiments, all of these purpose-built appliances may be part of a smart home network. For example, door lock 422 may include the electronic lock on the front door and security camera 426 may monitor the front porch.

Returning to FIG. 3, at step 304, one or more of the systems described herein may intercept, by a router of the local network, a request from a requesting device to access the pre-programmed functionality of the purpose-built appliance via the local network. For example, interception module 106 may, as part of router 202 in FIG. 2, intercept, by a router of network 204, request 210 from requesting device 212 to access pre-programmed functionality 208 of purpose-built appliance 206 via network 204.

The term "requesting device," as used herein, generally refers to any device making a request to connect to a purpose-built appliance on a local network. A requesting device may include a smartphone, laptop, or any other suitable type of computing device. In some examples, a requesting device may also be a purpose-built appliance. For example, a smart oven may request access to a speaker system in order to play a chime when the oven has finished pre-heating. In some examples, the requesting device may not be owned by the owner of the physical site.

Interception module 106 may intercept the request in a variety of ways. For example, interception module 106 may examine all requests passing through the router to determine if any requests are intended to initiate a connection with a purpose-built appliance. In another embodiment, interception module 106 may monitor requests directed to a specific port that is designated for requests for connection with purpose-built appliances.

At step 306, one or more of the systems described herein may query, from the router, via an authorization channel that is separate from a communication channel used to transmit the request, an owner of the physical site for authorization for the requesting device to access the pre-programmed functionality of the purpose-built appliance via the local network. For example, querying module 108 may, as part of router 202 in FIG. 2, query, from router 202, via authorization 216 channel that is separate from a communication channel used to transmit the request, owner 214 of the physical site for authorization 216 for requesting device 212 to access pre-programmed functionality 208 of purpose-built appliance 206 via network 204.

The term "channel," as used herein, generally refers to any instance of communication between two or more devices. For example, a communication channel used to receive the request may include an Internet connection while an authorization channel used to query the owner may include a text messaging communication channel. In some embodiments, the communication channel may use the same means of communication as the authorization channel. For example, both channels may send and receive messages via the Internet, but the authorization channel may be a separate transaction and/or session from the communication channel.

The term "owner," as used herein with reference to a physical site, generally refers to anyone who owns, occupies, and/or manages the physical site. In some examples, the term "owner" may refer to someone with a relationship to a physical site such that the person has explicit and/or implicit authorization to interact with devices at the physical site. For example, an owner of a home may include the legal owner of the home, other residents of the home, and/or verified guests within the home. In another example, an owner of an office may include employees in the office but may not include visitors to the office. In some embodiments, the owner of the physical site may include only the individuals responsible for managing devices at the site. In this embodiment, an owner of an office may include the systems administrator for the office and/or other employees may connect to purpose-built appliances within the office but only at the discretion of the systems administrator.

Querying module 108 may query the owner of the physical site in a variety of ways. For example, querying module 108 may send a text message, email, and/or other message to a device owned by the owner. In another example, querying module 108 may send a message to the requesting device asking for a token known only to the owner and/or may display a test page to the requesting device that includes an input field for the token. Additionally or alternatively, querying module 108 may signal to the owner that input authorizing the request is expected. For example, querying module 108 may query the owner by causing a light to blink on the router next to a button that can be pushed to authorize the most recent connection request.

In some examples, the requesting device may not be part of the local network and querying module 108 may query the owner based at least in part on not trusting the request because the requesting device has not demonstrated access to the local network. In some embodiments, querying module 108 may first determine whether a device is part of the local network before querying the owner for authorization.

At step 308, one or more of the systems described herein may receive, by the router, the authorization from the owner of the physical site for the requesting device to access the pre-programmed functionality of the purpose-built appliance via the local network. For example, receiving module 110 may, as part of router 202 in FIG. 2, receive, by router 202, authorization 216 from owner 214 of the physical site for requesting device 212 to access pre-programmed functionality 208 of purpose-built appliance 206 via network 204.

Receiving module 110 may receive the authorization in a variety of ways. For example, receiving module 110 may receive the authorization from the owner by receiving a response sent by the owner from an additional device. In some embodiments, the additional device may have been previously registered with the router as a device that is owned by the owner of the physical site. In these embodiments, receiving module 110 may check any device sending a response authorizing a connection attempt against a list of registered devices in order to determine whether the authorization originates from the owner of the physical site. In one example, if receiving module 110 receives an authorization response from a device that is not registered, receiving module 110 may disregard the authorization.

In one embodiment, receiving module 110 may receive the authorization from the owner by receiving physical input from the owner to an input sensor on the router. For example, the router may include a button that may be pressed to allow the most recent connection request to a purpose-built appliance on the local network. In another embodiment, the router may include a more sophisticated Input/Output (IO) scheme that may allow the owner to select which of several potential connection requests to authorize.

Additionally or alternatively, receiving module 110 may receive the authorization from the owner by receiving a response from the requesting device that includes a token previously provided to the owner. In some examples, the token previously provided to the owner may include a token physically inscribed on the router and/or a token sent to the owner while querying the owner for the authorization. In one example, the token may include a series of numbers printed on a sticker applied to the router.

At step 310, one or more of the systems described herein may forward, by the router, the request from the requesting device to the purpose-built appliance in response to receiving the authorization instead of blocking the request at the router. For example, forwarding module 112 may, as part of router 202 in FIG. 2, forward, by router 202, request 210 from requesting device 212 to purpose-built appliance 206 in response to receiving authorization 216 instead of blocking request 210 at router 202.

Forwarding module 112 may forward the request in a variety of ways. For example, forwarding module 112 may forward the request to the purpose-built appliance. In some embodiments, forwarding module 112 may also add the requesting device to a list of devices that are allowed to connect to the purpose-built appliance.

In one example, interception module 106 may intercept an additional request from an additional requesting device to access the pre-programmed functionality of the purpose-built appliance via the local network and querying module 108 may query the owner of the physical site for an additional authorization for the additional requesting device. In this example, receiving module 110 may fail to receive the additional authorization and forwarding module 112 may block the additional request from the additional requesting device. In some examples, receiving module 110 may fail to receive the additional authorization by receiving a response from the owner that declines the additional request. For example, the owner may send a message to the router declining to authorize the additional request and/or press a button on the router blocking the additional request. In another example, receiving module 110 may fail to receive the additional authorization by receiving an incorrect token from the additional requesting device and forwarding module 112 may block the additional request based on receiving the incorrect token.

In one example, interception module 106 may intercept an additional request from an additional requesting device to access the pre-programmed functionality of the purpose-built appliance via the local network and may determine that the additional requesting device is within the local network. In some embodiments, forwarding module 112 may forward the additional request in response to the determination that the additional requesting device is within the local network. In this embodiment, querying module 108 may not query the owner for authorization before forwarding module 112 forwards the additional request. For example, toaster 406 in FIG. 4 may send a request to connect to speaker system 412 in order to use speaker functionality 414 to play an alert when a bagel has finished toasting. In this example, forwarding module 112 may forward the request from toaster 406 to speaker system 412 without querying the owner for authorization because toaster 406 is part of local network 404.

In one example, interception module 106 may intercept an additional request from the requesting device to access the pre-programmed functionality of the purpose-built appliance via the local network and may determine that the requesting device previously received the authorization from the owner of the physical site. In some embodiments, forwarding module 112 may forward the additional request in response to the determination that the requesting device previously received the authorization instead of querying the owner of the physical site for an additional authorization.

In one embodiment, a requesting device that has received authorization from the owner to connect to one purpose-built appliance may then connect to any purpose-built appliance on the network. In other embodiments, the requesting device may be required to request authorization for each purpose-built appliance. For example, a device that has been previously authorized to connect with the sound system may be able to connect with the sound system again without querying the owner but may need to query the owner in order to connect with the thermostat. In some embodiments, an authorization, whether to use a specific purpose-built appliance or any purpose-built appliance, may expire after a predetermined period of time such as thirty days.

In some embodiments, a security policy may govern which purpose-built appliances require which level of authorization. For example, sensitive purpose-built appliances such as security cameras and locks may require authorization for each connection attempt, less sensitive purpose-built appliances such as speaker systems may only require a single authorization for repeated connection requests, and other purpose-built appliances such as toasters may not require any authorization. In another example, some purpose-built appliances may require authorization for any device that requests a connection while others may only require authorization from devices outside the network. For example, a security camera may require authorization from the owner before the router will forward any requests while a speaker system may only require authorization from the owner before the router will forward requests to the speaker system from outside the network. In this example, if a smart toaster on the local network becomes infected with a virus, the security camera may still be protected from the malicious toaster. In another example, an authorization for a device to connect to a speaker system may never expire while an authorization for a device to connect to a baby camera may expire after one week.

In one embodiment, a security policy may take into account which pre-programmed function of a purpose-built appliance is being requested. For example, a device may require authorization from the owner every time it sends a request to use the "change temperature" functionality of a thermostat but may require only one authorization to make multiple requests for the "show energy usage data" functionality of the thermostat. In another example, a local network may include an outdoor camera pointed at a bird feeder that may not require authorization to send requests to use the "view live footage" function but may require authorization to use the "move camera" function.

Figure 5:
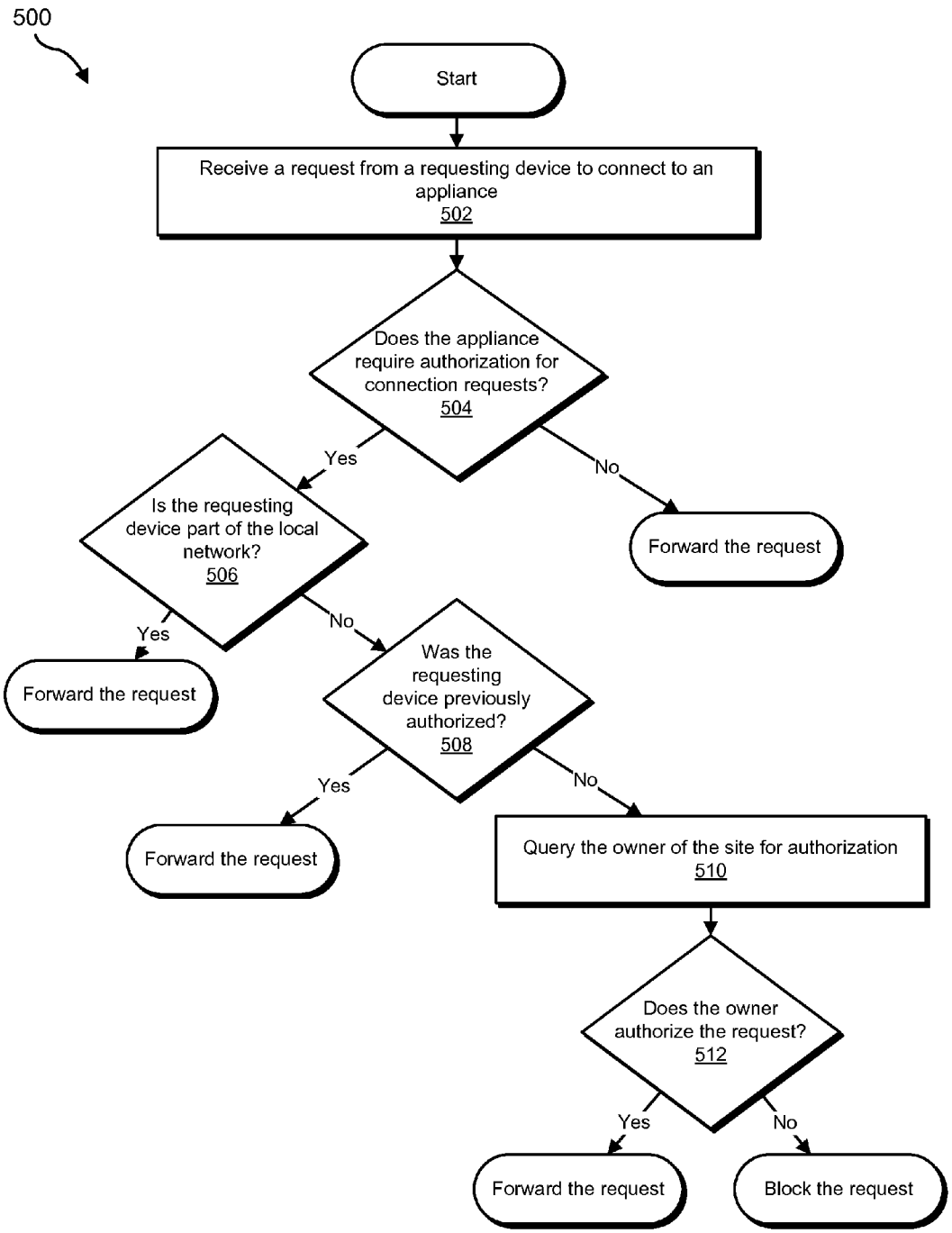
FIG. 5 is a flow diagram of an exemplary method for protecting purpose-built appliances on local networks.

As discussed above, different embodiments may go through various decision paths to determine whether to forward or block a requesting device's request to access a purpose-built appliance. FIG. 5 is a flow diagram of an exemplary method 500 for protecting purpose-built appliances on local networks. At step 502, a router may receive a request from a requesting device to connect to an appliance. At step 504, the systems described herein may determine whether the appliance requires authorization for connection requests. Some purpose-built appliances under some security policies, such as a printer at a coffee shop, may not require authorization for connection requests. If the appliance does not require authorization, the router may forward the request. If the appliance does require authorization, at step 506 the systems described herein may determine whether the requesting device is part of the local network. If the requesting device is part of the local network, the router may forward the request. If not, at step 508 the systems described herein may determine if the device was previously authorized. In some embodiments, the device must have been previously authorized to connect to this specific appliance. If the device has been sufficiently previously authorized for whatever the connection request is requesting, the router may forward the request. If not, at step 510 the router may query the owner of the site for authorization. If, at step 512, the owner authorizes the request, the router may forward the connection request to the appliance. If not, the router may block the request from reaching the appliance.

As explained in connection with method 300 above, the systems described herein may protect purpose-built appliances on a local network by intercepting all requests for connections with purpose-built appliances at the router. The systems described herein may forward connection requests from the router to the purpose-built appliance if an owner authorizes the connection attempt by pushing a button on a router, entering a token, and/or responding to a message with an authorization. Intercepting potentially malicious unauthorized requests at the router may provide a much higher level of security for a smart home network without relying on every individual purpose-built appliance to be securely designed.

Figure 6:
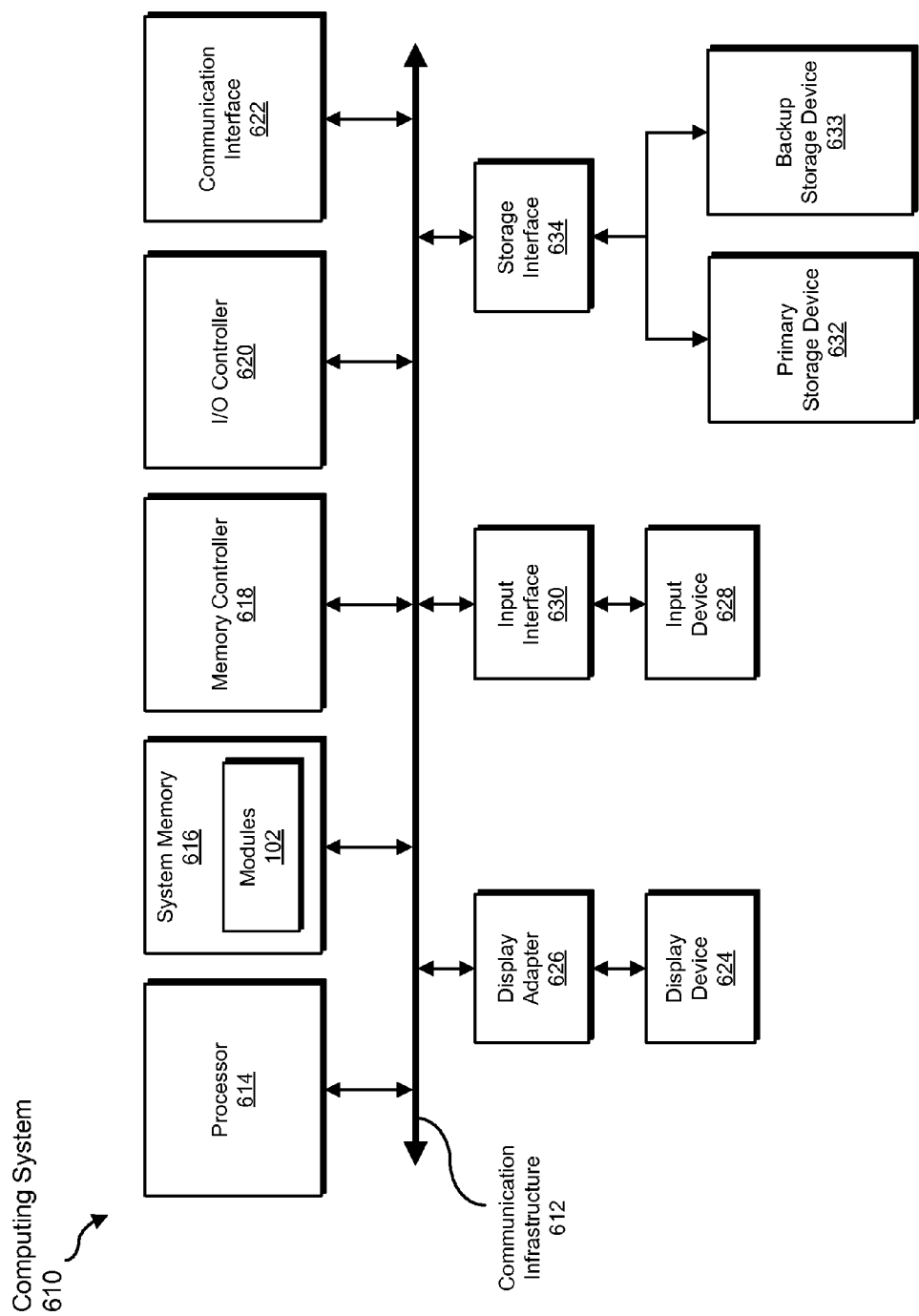
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
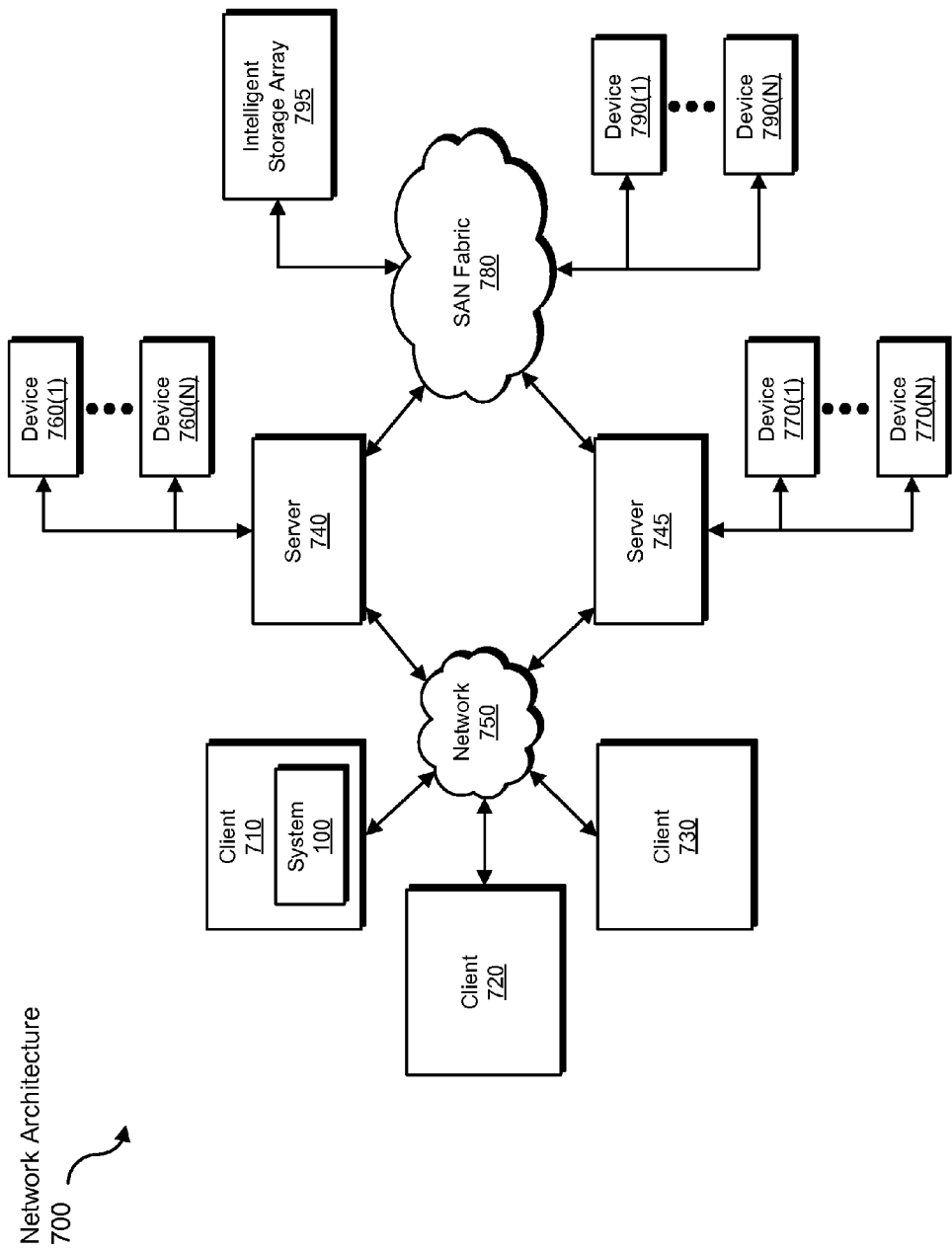
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for protecting purpose-built appliances on local networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to be transformed, transform the request into an authorization query, output a result of the transformation to an owner's device, use the result of the transformation to determine if the request is authorized, and store the result of the transformation to a list of authorized devices. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting purpose-built appliances on local networks, at least a portion of the method being performed by a computing device comprising at least one processor, the method comprising:
   identifying a purpose-built appliance that is installed at a physical site to enhance the physical site with a pre-programmed functionality and that is connected to a local network that operates at the physical site;
   intercepting, by a router that directs network traffic within the local network, a request from a requesting device to access the pre-programmed functionality of the purpose-built appliance via the local network;
   querying, from the router, via an authorization channel that is separate from a communication channel used to transmit the request, an owner of the physical site for authorization for the requesting device to access the pre-programmed functionality of the purpose-built appliance via the local network;
   receiving, by the router, the authorization from the owner of the physical site for the requesting device to access the pre-programmed functionality of the purpose-built appliance via the local network; and
   forwarding, by the router, the request from the requesting device to the purpose-built appliance in response to receiving the authorization instead of blocking the request at the router.

2. The computer-implemented method of claim 1, further comprising:
   intercepting, by the router of the local network, an additional request from an additional requesting device to access the pre-programmed functionality of the purpose-built appliance via the local network;
   querying, from the router, via the authorization channel, the owner of the physical site for an additional authorization for the additional requesting device to access the pre-programmed functionality of the purpose-built appliance via the local network;
   failing to receive, by the router, the additional authorization from the owner of the physical site for the additional requesting device to access the pre-programmed functionality of the purpose-built appliance via the local network; and
   blocking, by the router, the additional request from the additional requesting device from reaching the purpose-built appliance in response to failing to receive the additional authorization.

3. The computer-implemented method of claim 2, wherein failing to receive the additional authorization comprises receiving, by the router, a response from the owner that declines the additional request.

4. The computer-implemented method of claim 1, wherein:
   the requesting device is not part of the local network; and
   querying the owner is based at least in part on not trusting the request because the requesting device has not demonstrated access to the local network.

5. The computer-implemented method of claim 1, further comprising:
   intercepting, by the router of the local network, an additional request from an additional requesting device to access the pre-programmed functionality of the purpose-built appliance via the local network;
   determining that the additional requesting device is within the local network; and
   forwarding, by the router, the additional request from the additional requesting device to the purpose-built appliance in response to determining that the additional requesting device is within the local network instead of querying the owner of the physical site for the authorization.

6. The computer-implemented method of claim 1, wherein receiving, by the router, the authorization from the owner comprises receiving physical input from the owner to an input sensor on the router.

7. The computer-implemented method of claim 1, wherein receiving, by the router, the authorization from the owner comprises receiving a response sent by the owner from an additional device.

8. The computer-implemented method of claim 1, wherein receiving, by the router, the authorization from the owner comprises receiving a response from the requesting device that comprises a token previously provided to the owner.

9. The computer-implemented method of claim 8, wherein the token previously provided to the owner comprises at least one of:
   a token physically inscribed on the router; and
   a token sent to the owner while querying the owner for the authorization.

10. The computer-implemented method of claim 1, wherein the requesting device is not owned by the owner of the physical site.

11. The computer-implemented method of claim 1, further comprising:
   intercepting, by the router of the local network, an additional request from the requesting device to access the pre-programmed functionality of the purpose-built appliance via the local network;
   determining that the requesting device previously received the authorization from the owner of the physical site; and
   forwarding, by the router, the additional request from the requesting device to the purpose-built appliance in response to determining that the requesting device previously received the authorization instead of querying the owner of the physical site for an additional authorization.

12. The computer-implemented method of claim 1, wherein intercepting the request to access the pre-programmed functionality of the purpose-built appliance comprises determining that the purpose-built appliance is of a type that, according to a security policy, requires the authorization from the owner in order for the requesting device to access the pre-programming functionality of the purpose-built appliance.

13. A system for protecting purpose-built appliances on local networks, the system comprising:
   an identification module, stored in memory, that identifies a purpose-built appliance that is installed at a physical site to enhance the physical site with a pre-programmed functionality and that is connected to a local network that operates at the physical site;

an interception module, stored in memory, that intercepts, by a router that directs network traffic within the local network, a request from a requesting device to access the pre-programmed functionality of the purpose-built appliance via the local network;

a querying module, stored in memory, that queries, from the router, via an authorization channel that is separate from a communication channel used to transmit the request, an owner of the physical site for authorization for the requesting device to access the pre-programmed functionality of the purpose-built appliance via the local network;

a receiving module, stored in memory, that receives, by the router, the authorization from the owner of the physical site for the requesting device to access the pre-programmed functionality of the purpose-built appliance via the local network;

a forwarding module, stored in memory, that forwards, by the router, the request from the requesting device to the purpose-built appliance in response to receiving the authorization instead of blocking the request at the router; and at least one physical processor configured to execute the identification module, the interception module, the querying module, the receiving module, and the forwarding module.

14. The system of claim 13, wherein:
the interception module intercepts, by the router of the local network, an additional request from an additional requesting device to access the pre-programmed functionality of the purpose-built appliance via the local network;
the querying module queries, from the router, via the authorization channel, the owner of the physical site for an additional authorization for the additional requesting device to access the pre-programmed functionality of the purpose-built appliance via the local network;
the reception module fails to receive, by the router, the additional authorization from the owner of the physical site for the additional requesting device to access the pre-programmed functionality of the purpose-built appliance via the local network; and
the forwarding module blocks, by the router, the additional request from the additional requesting device from reaching the purpose-built appliance in response to failing to receive the additional authorization.

15. The system of claim 14, wherein the reception module fails to receive the additional authorization by receiving, by the router, a response from the owner that declines the additional request.

16. The system of claim 13, wherein:
the requesting device is not part of the local network; and
the querying module queries the owner based at least in part on not trusting the request because the requesting device has not demonstrated access to the local network.

17. The system of claim 13:
wherein the interception module intercepts, by the router of the local network, an additional request from an additional requesting device to access the pre-programmed functionality of the purpose-built appliance via the local network;
further comprising a determination module, stored in memory, that determines that the additional requesting device is within the local network; and
wherein the forwarding module forwards, by the router, the additional request from the additional requesting device to the purpose-built appliance in response to determining that the additional requesting device is within the local network instead of querying the owner of the physical site for the authorization.

18. The system of claim 13, wherein the receiving module receives, by the router, the authorization from the owner by receiving physical input from the owner to an input sensor on the router.

19. The system of claim 13, wherein the receiving module receives, by the router, the authorization from the owner by receiving a response sent by the owner from an additional device.

20. A non-transitory computer-readable medium comprising one or more computer-readable instructions that, when executed by at least one processor of a computing device, cause the computing device to:
identify a purpose-built appliance that is installed at a physical site to enhance the physical site with a pre-programmed functionality and that is connected to a local network that operates at the physical site;
intercept, by a router that directs network traffic within the local network, a request from a requesting device to access the pre-programmed functionality of the purpose-built appliance via the local network;
query, from the router, via an authorization channel that is separate from a communication channel used to transmit the request, an owner of the physical site for authorization for the requesting device to access the pre-programmed functionality of the purpose-built appliance via the local network;
receive, by the router, the authorization from the owner of the physical site for the requesting device to access the pre-programmed functionality of the purpose-built appliance via the local network; and
forward, by the router, the request from the requesting device to the purpose-built appliance in response to receiving the authorization instead of blocking the request at the router.

* * * * *